United States Patent Office 3,424,602
Patented Jan. 28, 1969

3,424,602
PROCESS FOR PRODUCING SODIUM ALUMINUM SILICATE PIGMENTS
Peter Nauroth, Wesseling, Bezirk, Cologne, Germany, assignor to Deutsche Gold- und Silber-Scheidenstalt vormals Roessler, Frankfurt am Main, Germany, a corporation of Germany
No Drawing. Filed June 24, 1966, Ser. No. 560,099
Claims priority, application Germany, July 9, 1965, D 47,694
U.S. Cl. 106—288            5 Claims
Int. Cl. C09c 1/40, 1/28; C01b 33/26

---

ABSTRACT OF THE DISCLOSURE

Amorphous almost neutral reacting sodium aluminum silicate pigments of superior opacifying properties are produced by adding over a period of about 30 minutes to 10 hours aluminum sulfate to an aqueous solution maintained at a high temperature (e.g., 50 to 100° C.) and a pH above 10 and reacting it therein with alkali silicate. Following the precipitation the suspension is brought to a pH of about 1.5 to 8 using aluminum sulfate and/or mineral acid.

---

This invention relates to a process for producing pigments by precipitation which are X-ray amorphous, insoluble in water, almost neutral in their reaction and which consist primarily of silicon dioxide, aluminum oxide, sodium oxide and water.

Precipitated pigments of said composition are already available. They serve especially for brightening paper and for improving the coverability of dispersion colors. However, their high alkalinity which is caused by sodium oxide bonded in the precipitate is a disadvantage.

According to German Patent 1,005,215, it is known to obtain precipitates of a pigment type by combining reaction components which have been diluted to a given concentration during vigorous stirring. The precipitation process takes place in approximately 15 minutes at a temperature of 26–30° C. and pH values between 8 and 12. At the end of precipitation, the pH is adjusted to 9.5. The volume of the given aqueous medium should amount to at least half the sum of the volume of the added solutions. The reaction suspension is brought to a pH value between 8 and 9.5 at the end of precipitation. The thus produced sodium aluminum silicates, as subsequent testing showed, have pH values of 10.5 to 11.5 in a 4% aqueous suspension.

If such an alkaline pigment is added to paper material to improve the optical properties of the paper, an increased quantity of alum must be added to the paper during the standard sizing of the paper by the addition of alum. Alum contributes to the yellowing of paper.

In dispersion colors, which for example contain polyvinyl acetate dispersions as binders, basic pigments result in thickening and coagulation and thus make the colors useless.

In accordance with the present invention, there is provided a process for producing, by precipitation from alkali silicate and aluminum sulfate solutions, pigments which are X-ray amorphous, insoluble in water and almost neutral reacting and which consist primarily of silicon dioxide, aluminum oxide, sodium oxide and water. Said pigments when used in the processing of paper and in producing colors are without the aforesaid disadvantages and are much superior to commercially available silicate pigments in improving the optical properties of the paper.

In the practice of this invention, the reaction components are added slowly, e.g., within a period of about 30 minutes to about 10 hours, to an aqueous stock solution either simultaneously or in sequence at a high temperature, preferably about 50 to about 100° C. while stirring and while maintaining a high pH value of above about 10, preferably above 12. The suspension is brought to low pH values of about 1.5 to about 8 at the end of the precipitation while maintaining a high temperature by the addition of aluminum sulfate and/or mineral acid, e.g., HCl, $HNO_3$, $H_2CO_3$, $H_2SO_4$, etc.

If diluted alkali silicate solution is reacted with diluted aluminum salt solution at ambient temperature with the maintenance of an alkali pH value of the mixture, gel-like precipitates usually result. Such precipitates cannot be used as pigments in the aforesaid applications after washing and drying due to their hardness and their transparency. If the concentration of the reaction components is increased under the aforesaid conditions so that a pigment concentration of more than 70 grams per liter, related to the pigment dried at 105° results, the entire contents of the tank can harden or become lumpy.

Surprisingly, the aforesaid disadvantages do not occur in the practice of the present invention due to the slow precipitation according to the invention at a much higher temperature (preferably 50 to 100° C.) and due to the addition of aluminum sulfate and/or mineral acid to the suspension at the end of the precipitation which is likewise at a high temperature. On the contrary, a sodium aluminum silicate which is suitable in an advantageous way as a pigment for brightening paper and for improving the covering power of dispersion colors is produced.

It does not matter whether the entire alkali silicate solution is used for the precipitation and the aluminum sulfate solution runs into it or whether only part of the alkali silicate solution together with water is used as the base solution and the remaining silicate solution together with the aluminum sulfate solution is fed at alkaline pH values.

According to a preferred embodiment just enough water is used that the stirrer seizes the liquid from the very beginning, that is, about ⅕ to about 1/10 of the volume of the reaction solutions flowing in. Since the suspension remains highly fluid at all times, standard, slowly rotating gate paddle stirrers or flat paddle mixers are adequate for mixing. The inexpensive, commercial soda water glass (molar ratio $Na_2O:SiO_2=1:3.36$) is preferable as the alkali silicate. It produces first-rate pigments. However, sodium silicate with other molar ratios, as well as potassium silicates, can be used. Typically, the alkali silicate solution is used as a dilute solution with about 8 to about 16 percent $SiO_2$.

Experiments showed that precipitates with pigment properties formed if the electron microscopic primary particle size is about 25 to about 100 millimicrons, and the primary particles are combined into aggregates of about 200 to about 1200 millimicrons in size.

Said particle sizes and aggregation sizes are especially easy to obtain according to the invention if the precipitation is conducted slowly and at a high temperature. Precipitation times of approximately 30 minutes to approximately 10 hours, according to the size of the precipitation vessel and the quality of the pigment are preferred at temperatures of about 50 to about 100° C. The concentration of the reaction components is desirably adjusted so that the suspension contains about 20 to about 150 grams per liter pigment, based on the weight of the pigment dried at 105° C., at the end of the precipitation.

On the other hand, the particles which are obtained at ambient temperature and with a rapid precipitation have diameters of about 10 to about 20 millimicrons. The secondary aggregates formed therefrom decompose easily upon acidifying with a loss of pigment properties.

The aggregates which are produced according to the claimed process and which consist of primary particles of about 25 to 100 millimicrons, however, are retained even with strong acidification and their effect is even improved.

EXAMPLE I

Into a closed, stirred vessel constructed of acid-resistant steel are placed 5.4 liters of diluted, commercial soda water glass (molar ratio 1:3.35; density 1.115). The vessel holds 30 liters and is provided with a reflux condenser.

The mixture is heated to 90° C. indirectly with a gas burner and is kept at this temperature during the entire period of the process.

Within 75 minutes, 10.3 liters of aluminum sulfate solution (density 1.025) are introduced while the mixture is stirred with a flat paddle mixer. Finally, the suspension is treated drop by drop with 128 milliliters of a 1:1 diluted sulfuric acid at 90° C. (while being stirred) until a pH value of 2.8 is reached.

The precipitate is filtered off, washed free from salts forming during the reaction and from excess acid, is dried at 105° C., and ground on a disk attrition mill.

730 grams of a white, voluminous powder with the following properties is obtained:

| | | |
|---|---|---|
| Bulk weight | g./l. | 130 |
| pH value of the 4% aqueous suspension | | 6.5 |
| BET surface | m.²/g. | 440 |
| $SiO_2$ | percent | 76.1 |
| $Al_2O_3$ | do | 5.9 |
| $Na_2O$ | do | 3.0 |
| Loss on ignition | do | 14.6 |

EXAMPLE II 4.2 liters water are placed in a closed mixing vat of acid resistant steel which is provided with a reflux cooler and holds 30 liters.

This water is indirectly heated to 60° C. with a gas burner and kept at this temperature during precipitation. Now a solution of water glass (molar ratio 1:3.36) which is diluted to a 13% $SiO_2$ content is added and, as soon as the receiving mixture has reached the pH value 12, an aluminum sulfate solution with a 1.4% $Al_2O_3$ content is allowed to flow in at another place which is opposite the inflow point of the silicate solution. The solutions reacting together are determined with a flow meter so that 12.6 liters silicate solution and 11.6 liters aluminum sulfate solution are introduced in 100 minutes. The suspension is stirred with a flat paddle mixer, diameter 20 cm., height 5 cm., at 50-70 r.p.m. During precipitation, a pH value of approximately 12 is maintained by controlling the inlet flow of the aluminum sulfate solution in the medium.

The precipitation is ended after the passage of 100 minutes. The suspension is brought to pH 6 at 60° C. by the addition of aluminum sulfate solution. The stirring is continued for 15 minutes longer. The suspension contains 75 grams pigment per liter (dried at 105° C.).

The precipitate is filtered off; washed; dried at 105° C.; and ground on a disk attrition mill.

2100 grams of a fine white powder with the following properties result:

| | | |
|---|---|---|
| Bulk weight | g./l. | 70 |
| pH value of the 4% aqueous suspension | | 7.5 |
| BET surface | m.²/g. | 260 |
| Average electron microscopic particle size | millimicrons | 30 |

According to an electron microscope study, the primary particles are combined into secondary aggregates of about 0.2 to about 2 microns, about 1 micron on the average.

Crystal structure: X-ray amorphous.

The following table shows the superiority of the pigment produced according to the invention as compared to commercial calcium and aluminum silicates.

OPTICAL PROPERTIES OF A SHEET OF PAPER WITH A 4% FILLER, MEASURED WITH THE ELREPHO-INSTRUMENT OF ZEISS AT A LIGHT WAVELENGTH OF 460 M$\mu$

| Material | Alum requirement [1] g./Al$_2$(SO$_4$)$_3$/kg. Pigment | White content [2] R$_0$ R$_\infty$ [3] | Transparency [4] ×10² |
|---|---|---|---|
| Commercial calcium silicate I | 466 | 75.2    87.8 | 4.85 |
| Commercial calcium silicate II | 510 | 75.8    87.8 | 4.98 |
| Commercial aluminum silicate I | 118 | 75.7    89.1 | 5.67 |
| Commercial aluminum silicate II | 108 | 74.3    89.1 | 6.42 |
| Aluminum silicate produced according to Example II of the application | 50 | 78.0    89.2 | 4.23 |

[1] 4 grams filler diluted to 100 milliliters with distilled H$_2$O. Aluminum sulfate solution 50 grams Al$_2$(SO$_4$)$_3$/l. up to pH 4.5 allowed to flow in within 15-20 minutes. Automatic titrator TTl from Radiometer, Kopenhagen. Reaction time 5 seconds.
[2] Remission of a sheet of paper placed on a black base.
[3] Remission of a layer of paper of such a thickness that no light can penetrate (= white content).
[4] Transparency is determined according to the formula $\frac{m-n}{m+n}$ Here
$m$=remission of a sheet of paper on a white base with a known white content (79.8%).
$n$=remission of a sheet of paper on a black base with a known white content (0.8%).

The opacity of a paper increases as the transparency value decreases. Aluminum sulfate solutions containing from about 0.41 to about 2.15 percent $Al_2O_3$ equivalent may be used.

I claim:
1. The method of producing a sodium aluminum silicate pigment which comprises slowly introducing alkali silicate solution and aluminum sulfate solution within a period of about 30 minutes to about 10 hours to a hot aqueous receiving solution at above about 50° F. to form a suspension while maintaining the pH of the suspension above about 10 during the precipitation and thereafter adding a material selected from the group consisting of aluminum sulfate, mineral acid and a combination thereof to the suspension to adjust the pH to about 1.5 to about 8.

2. The method of claim 1 wherein the hot aqueous receiving solution is maintained at a pH above 12 and between about 50 and about 100° C. during the entire precipitation.

3. The method of claim 2 wherein the suspension is maintained between about 50 and about 100° C. during the adjustment of the pH thereof.

4. The mehod of claim 2 wherein the alkali silicate solution is a dilute solution with about 8 to about 16 percent $SiO_2$ and a molar ratio of $Na_2O:SiO_2=1:3.36$.

5. The method of claim 2 wherein the aluminium sulfate solution contains about 0.41 to about 2.15 percent $Al_2O_3$ equivalent.

References Cited

UNITED STATES PATENTS 3,228,784    1/1966    Mays et al.

JAMES E. POER, *Primary Examiner.*

U.S. Cl. X.R.

23—110